United States Patent

Shin

[11] Patent Number: 5,879,785
[45] Date of Patent: Mar. 9, 1999

[54] POSITION SENSOR PCB MOUNTING STRUCTURE FOR ELECTRIC MOTOR

[75] Inventor: Hyoun-Jeong Shin, Inchon, Rep. of Korea

[73] Assignee: LG Electronics Inc., Rep. of Korea

[21] Appl. No.: 704,264

[22] Filed: Aug. 28, 1996

[30] Foreign Application Priority Data

Sep. 5, 1995 [KR] Rep. of Korea ............... 1995 28912

[51] Int. Cl.$^6$ .................................................. B32B 3/00
[52] U.S. Cl. .................. 428/209; 428/458; 428/460; 428/461; 428/901
[58] Field of Search .................. 428/328, 195, 428/418, 460, 458, 461, 419, 901, 411.1, 209

[56] References Cited

U.S. PATENT DOCUMENTS

| | | | |
|---|---|---|---|
| 4,492,730 | 1/1985 | Oishi et al. | 428/328 |
| 4,791,526 | 12/1988 | Breu et al. | 361/398 |
| 5,381,598 | 1/1995 | Adachi et al. | 29/845 |
| 5,409,399 | 4/1995 | Geoghegan et al. | 439/567 |
| 5,429,087 | 7/1995 | Tsujino et al. | 123/336 |
| 5,610,457 | 3/1997 | Kurita | 310/688 |

*Primary Examiner*—Elizabeth Evans
*Attorney, Agent, or Firm*—Ostrolenk, Faber, Gerb & Soffen, LLP

[57] ABSTRACT

An improved position sensor printed circuit board (PCB) mounting structure for a commutatorless motor which includes a casing forming an outer housing of the motor includes a PCB holder having a convex shape and being integral with the casing, a sensor PCB having a plurality of position sensors and a plurality of sensor input/output terminal pads for lead wires provided on an upper surface thereof at mutually equal distances therebetween and mounting grooves provided on the PCB holder for detachably mounting the sensor PCB at the correct position thereon.

16 Claims, 4 Drawing Sheets

POSITION SENSOR PCB MOUNTING STRUCTURE FOR ELECTRIC MOTOR

BACKGROUND OF THE INVENTION

1. Field of the Invention

The present invention relates to a position sensor printed circuit board (PCB) mounting structure for a commutatorless electric motor, and in particular, to an improved position sensor PCB mounting structure for a commutatorless motor in which the sensing ability of a position sensor is enhanced, an easy operation of the motor is obtained and the service life of the motor is increased by making the replacement of a sensor PCB provided inside the motor easy and which has the benefit of improving a mounting structure of the sensor PCB and the position sensor.

2. Description of the Prior Art

As shown in FIG. 1, in a the conventional commutatorless motor, a stator 1 is disposed at both walls of a casing 4 which forms the outer housing of a motor.

On the peripheral surface of the stator 1, coils are wound, and when power is applied to these coils, a magnetic force is generated.

Inside the stator 1, a rotor 2 rotated by the magnetic force of the stator 1 is disposed spaced from the stator 2, and at a central portion of the rotor, an armature shaft 3 rotating together with the rotor 2 is provided.

At the ends of the armature shaft 3, bearings 6 are disposed for smoothly rotating the armature shaft 3, and on the peripheral surface of the rotor 2, a plurality of permanent magnets 5 having magnetic poles arranged at regular intervals from each other are provided.

And, at one portion inside the casing 4, a sensing unit 300 is fixedly installed for sensing the rotation of the motor by detecting the position of the rotor 2 and supplying the sensed position information to a driving circuit for applying power to the stator 1.

Now, the construction of the sensing unit 300 will be described in detail.

As shown in FIGS. 2 and 3, a sensor printed circuit board (PCB) 11 is provided at one end of a sensor housing 12 mounted to the casing 4 with fastening screws 13, and is fixed by a PCB fastening screw 10.

And, a plurality of position sensors 8 for sensing the position of the magnetic poles of the rotor 2 and supplying the sensing information to the driving circuit for sequentially applying power to the coils of the stator 1, are mounted on the upper surface of the sensor PCB 11.

Here, the position sensors 8, as shown in FIG. 3, are disposed to have a mutually equal spacing on the surface of the sensor PCB 11 having a semicircumferential shape, and the leg 9 of each position sensor 8 is mounted to the sensor PCB 11 through soldering. A through hole type of leg 9 is used.

The sensor PCB arrangement of the conventional commutatorless motor will now be described in detail.

When the motor is driven, as shown in FIG. 1, the sensing unit 300 locates the position of the rotating rotor 2, and based upon the sensed position the driving circuit applies power sequentially to the stator coils, resulting in the generating of torque in the motor.

Here, in the radial direction, the position sensors 8 in the sensing unit 300 are positioned to have a distance of 12 mm from the inside of the permanent magnets 5 disposed in the shape of a hollow circular cylinder and having their magnetic poles equally divided, and in the axial direction of the armature shaft 3, as shown in FIG. 1, the position sensor 8 is positioned where the permanent magnets 5 axially protrude from the rotor 2.

Therefore, a signal is generated in each position sensor 8 as the magnetic flux from the permanent magnets 5 of the rotor 2 passes through the position sensor 8, and this signal generates a pulse signal through the driving circuit on the sensor PCB.

Here, since the position sensor 8 locates the position relative to the circumferential direction of the stator 1, the pulse signal locates the position of the rotor 2 relative to the stator 1.

That is, by using the position signal of the rotor 2 outputted from the position sensor 8, power is applied to each phase of the stator coil 1, but, the circumferential angle between the position sensor 8 and the stator 1 must be accurately set to generate the pulse signal at the correct point.

However, since the conventional commutatorless motor has a construction in which the sensing unit is installed inside the casing, it is difficult to place the position sensor installed in the sensing unit at the correct position when assembling the motor, and as a result there can occur much error.

Further, since the sensor housing must be provided, the material cost is high, and since the position sensor is mounted on the sensor PCB in the shape of cantilever beams, the position signals generated from the position sensors can be distorted due to the vibration of the position sensors caused by the rotation of the motor, consequently causing the motor to be abnormally operated.

In addition, when the motor is used for a long time, since the soldering mounting the position sensors to the sensor PCB is apt to fall off due to the vibration, the position sensors can become detached from the sensor PCB, resulting in the shortening of the life of the position sensor.

SUMMARY OF THE INVENTION

Accordingly, it is an object of the present invention to provide an improved position sensor PCB mounting structure for a commutatorless motor, the sensing ability of which is improved and the life of which is increased by achieving an easy assembling operation of the motor and allowing the position sensor to be little influenced by the vibration generated by the rotation of the motor.

To achieve the above object, there is provided an improved position sensor printed circuit board (PCB) for a commutatorless motor having a casing forming an outer housing of the motor which includes a PCB holder having a curved shape and being integral with and extending from the casing, a sensor PCB having a plurality of position sensors and a plurality of sensor input/output terminal pads for connecting lead wires provided on an upper surface thereof at mutually equal distances therebetween, and a holding unit provided on the PCB holder for detachably mounting the sensor PCB on the PCB holder.

which includes a casing forming an outer housing of the motor, a PCB holder having a convex shape and being integral with the casing, a sensor PCB having a plurality of position sensors and a plurality of sensor input/output terminal pads for lead wires provided on an upper surface thereof at mutually equal spacings therebetween, and a holding unit for combining a PCB guider and a sensor PCB at the correct position.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The position sensor PCB mounting structure for a commutatorless motor according to the present invention will now be described in detail with reference to the accompanying drawings.

Figure 1:
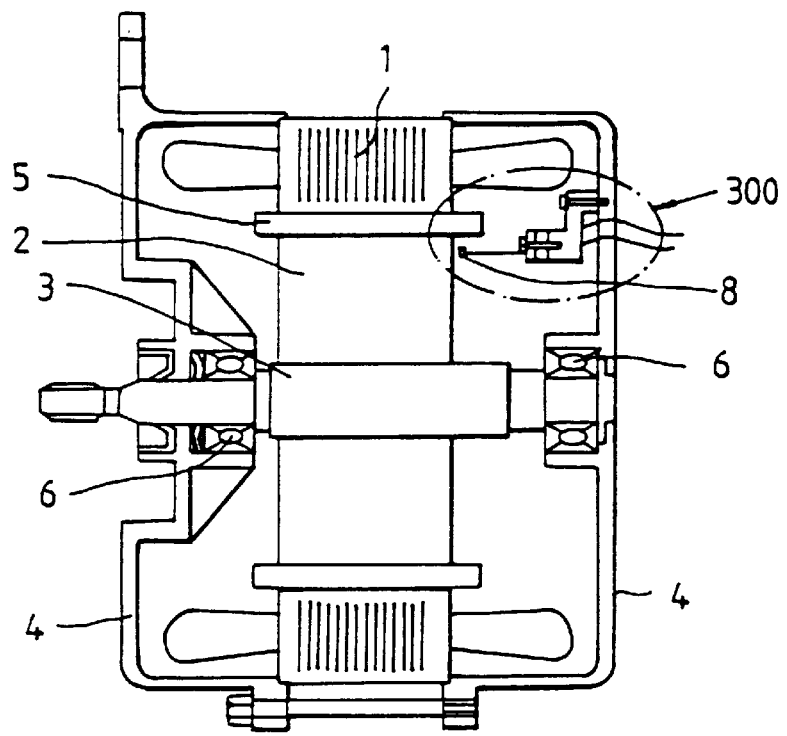
FIG. 1 is a cross-sectional view of a conventional commutatorless motor.
Figure 2:
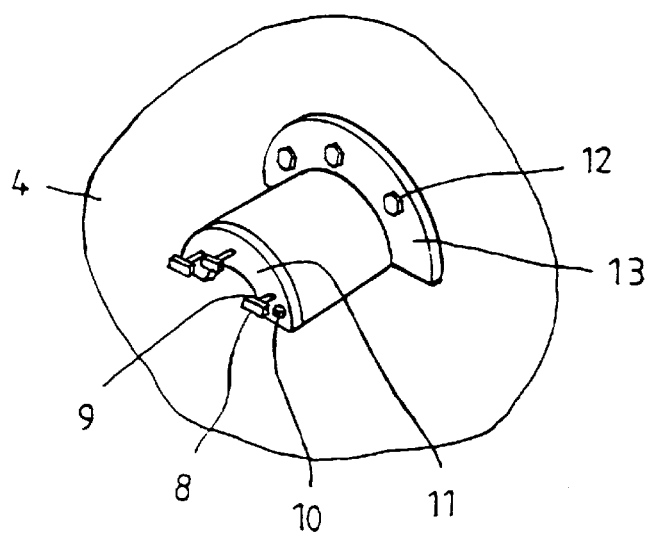
FIG. 2 is a detailed perspective view of a position sensing unit of the conventional commutatorless motor.
Figure 3:
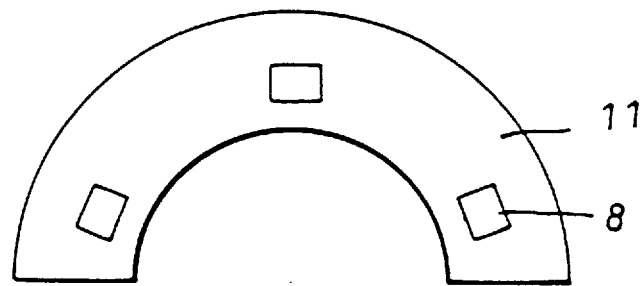
FIG. 3 is a front view of a position sensing unit of FIG.2.
Figure 4:
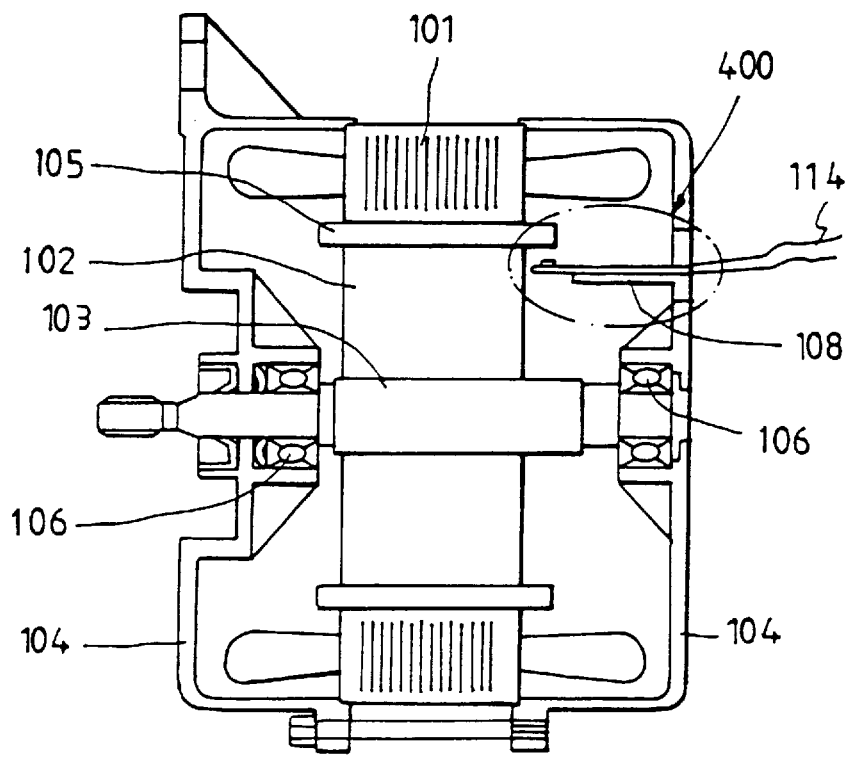
FIG. 4 is a cross-sectional view of a commutatorless motor adopting the sensor PCB mounting structure according to the present invention.

As shown in FIG.4, the commutatorless motor adopting the sensor PCB assembly and mounting structure according to the present invention includes the same elements as in the conventional motor construction of FIG. 1, namely, a stator 101, rotor 102, armature shaft 103, casing 104, rotor magnets 105 and shaft bearings 106.

At one inner side of the casing 104, a position sensing unit 400 is fixedly provided for sensing the position of the rotor 102 for controlling a driving circuit for applying power to the stator 101 for generating torque in the motor.

The construction of the position sensing unit 400 will now be described in more detail.

Figure 5:
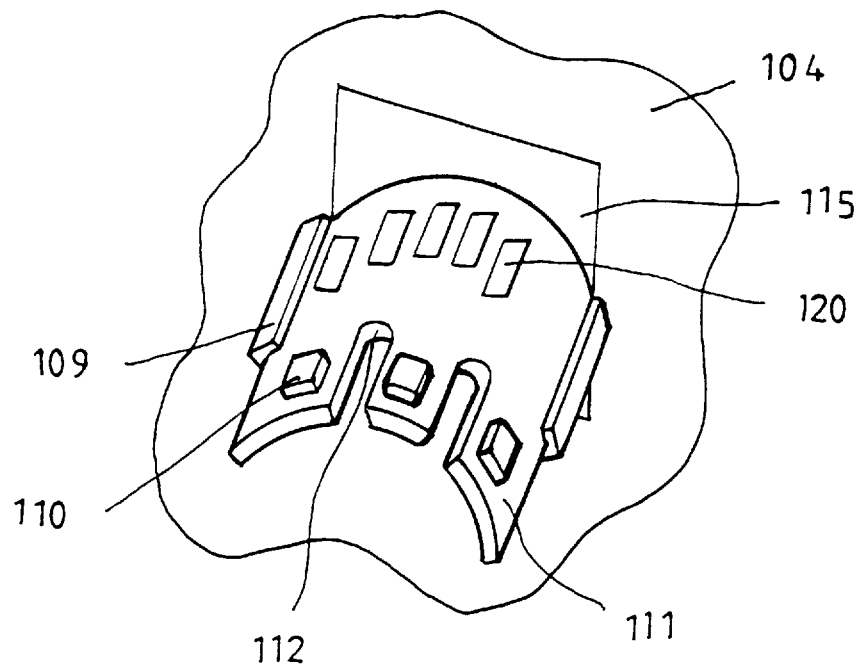
FIG. 5 is a detailed perspective view of a position sensing unit of a commutatorless motor according to the present invention.

As shown in FIGS. 4 and 5, extending from an inner surface of the casing 104 is provided a PCB holder 108 being integral with the casing 104 and having a curved shape forming a concentric arc with the rotating center of the rotor 102.

And in the PCB holder 108, a detachable sensor PCB 111 having a driving circuit thereon is disposed.

Figure 6:
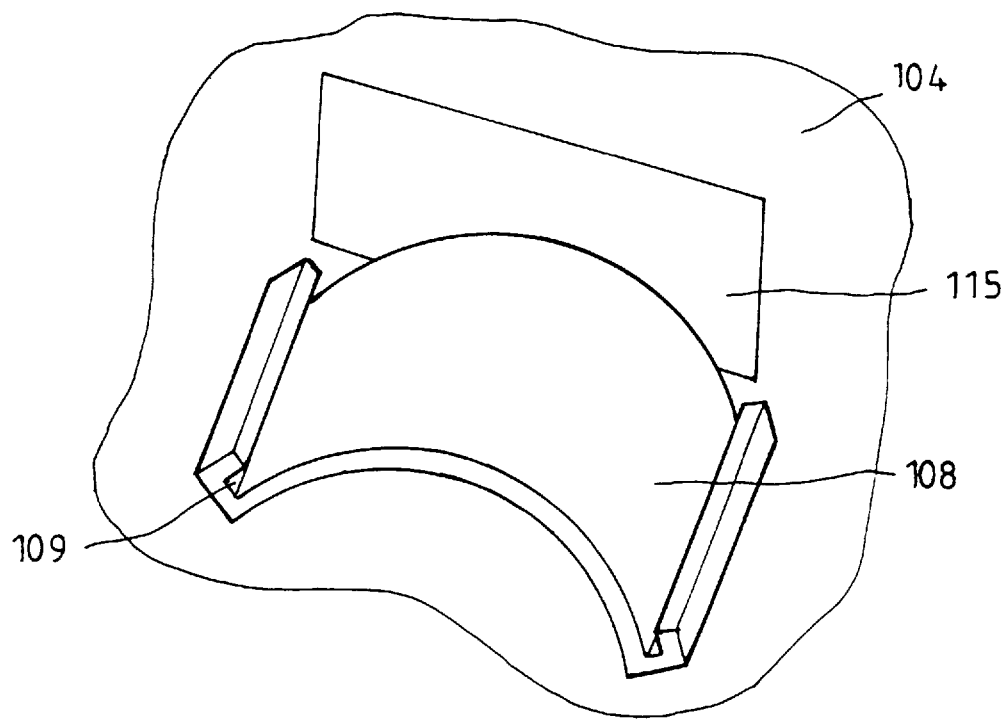
FIG. 6 is a detailed perspective view of a PCB holder for a commutatorless motor according to the present invention.

Here, at each side of the PCB holder 108, as shown in FIG.6, a mounting groove 109 is formed to detachably hold the sensor PCB 111 at the correct position in the PCB holder 108.

Figure 7:
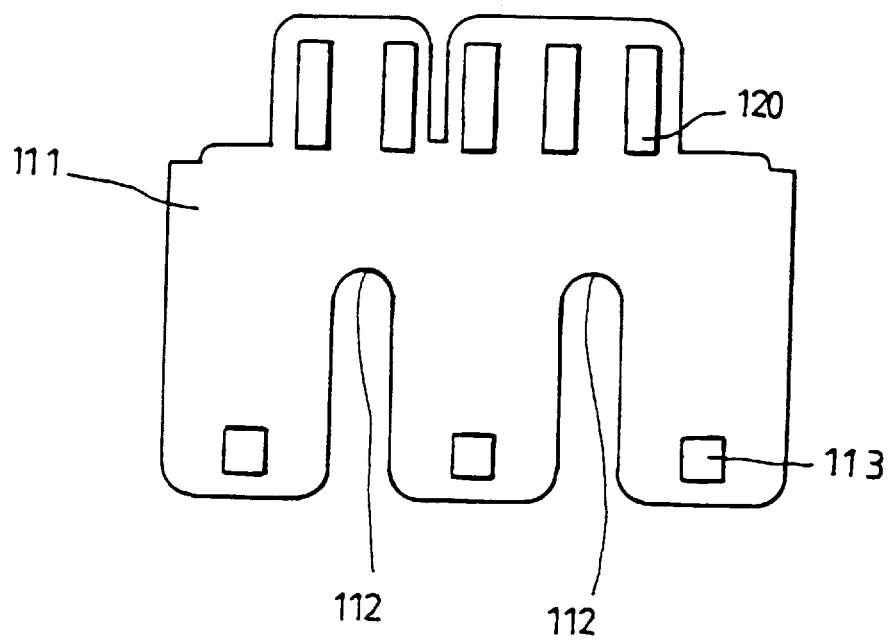
FIG. 7 is a view of a sensor PCB for a commutatorless motor according to the present invention.

In one edge surface of the sensor PCB 111, as shown in FIGS. 5 and 7, a plurality of notches 112 are formed, whereby the sensor PCB 111, which is formed as a flexible circuit, maybe bent to curve conformably along the outer curved surface of the PCB holder 108 and inserted in the mounting grooves 109 of the PCB holder 108 for easy mounting.

As shown in FIG. 4, the PCB holder 108 and the notches 112 of the sensor PCB 111, are formed to have a shorter length than the sensor PCB 111 in the axial direction of the armature shaft 103.

The reason for the above is for the purpose of achieving a precision of sensing by minimizing the distance between position sensors 110 attached to the sensor PCB 111 and the ends of the permanent magnets 105 due to the shortened axial length of the PCB holder 108.

And, the plurality of Hall effect position sensors 110 for sensing the position of the magnetic poles of the rotor 102 and supplying the sensing information to the driving circuit for sequentially applying power to the coils of the stator 101, as shown in FIG. 7, are mounted on the upper surface of the sensor PCB 111 by soldering the position sensor 110 on a corresponding soldering pad 113 formed on the sensor PCB 111, using surface mounting type (hereinafter, called SMT) leads.

Here, the plurality of position sensors 110 are arranged at mutually equal distances from one another.

As shown in FIGS. 4 and 5, in one portion of the casing 104, a lead passage 115 is formed for passing lead wires 114 connected to sensor input/output terminal pads 120 of the sensor PCB 111. The terminal pads 120 are provided on an extended narrower edge of the sensor PCB 111 opposite the sensors 113, which edge may also have one or more notches fro easier curving.

As described above, according to the present invention, since the position sensors are mounted to the sensor PCB by soldering using SMT leads, the position sensors are little influenced by the vibration generated by the rotation of the motor, and the position signal outputted from the position sensor is not distorted, resulting in achieving a better sensing operation and an increased life.

Further, since the sensor PCB can be detachably mounted at the correct position due to the mounting groove formed in the PCB holder integral with the casing and the plurality of notches provided in one or both edges of the sensor PCB, an easier assembly operation can be achieved, and elimination of the conventional sensor housing unit results in less material cost and assembly steps.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A position sensor printed circuit board (PCB) mounting structure for a commutatorless electric motor having a casing forming an outer housing of the motor, the structure comprising:

a PCB holder extending inwardly of the casing, the PCB holder having an outer surface having a curved shape forming an arc concentric with a rotation center of a rotor of the motor; and a sensor PCB detachably and conformably held on the outer curved surface of the PCB holder.

2. The sensor PCB mounting structure of claim 1, wherein the PCB holder is provided at each side thereof with a mounting groove, and wherein the sensor PCB is inserted into the mounting grooves of the PCB holder and held thereby.

3. The sensor PCB mounting structure of claim 1, wherein the sensor PCB is formed as a flexible circuit.

4. The sensor PCB mounting structure of claim 1, wherein a plurality of position sensors are mounted on a surface of the sensor PCB.

5. The sensor PCB mounting structure of claim 4, wherein the plurality of position sensors are arranged at mutually equal distances from one another.

6. The sensor PCB mounting structure of claim 4, wherein the position sensors are Hall effect sensors.

7. The sensor PCB mounting structure of claim 4, wherein the position sensors are soldered onto corresponding soldering pads provided on the sensor PCB using surface mounting type (SMT) leads.

8. The sensor PCB mounting structure of claim 1, wherein a plurality of sensor input/output terminal pads are provided on a surface of the sensor PCB for connecting lead wires thereto.

9. The sensor PCB mounting structure of claim 8, wherein a lead passage is formed in the casing of the motor for passing lead wires connected to the plurality of sensor input/output terminal pads provided on the sensor PCB.

10. The sensor PCB mounting of claim 8, wherein the sensor PCB has an extended narrower edge and the plurality of sensor input/output terminal pads are provided on the extended narrower edge of the sensor PCB.

11. The sensor PCB mounting structure of claim 10, wherein a plurality of position sensors are provided on the surface of the sensor PCB opposite the extended narrower edge wherein the plurality of sensor input/output terminal pads are provided.

12. The sensor PCB mounting structure of claim 10, wherein at least one notch is formed in the extended narrower edge of the sensor PCB for facilitating curving of the sensor PCB.

13. The sensor PCB mounting structure of claim 1, wherein the PCB holder has a shorter length than the sensor PCB in an axial direction of an armature shaft of the motor.

14. The sensor PCB mounting structure of claim 1, wherein a plurality of notches are formed in at least one edge of the sensor PCB for facilitating curving of the sensor PCB conformably along the outer curved surface of the PCB holder.

15. The sensor PCB mounting structure of claim 14, wherein the notches formed in the at least one edge of the sensor PCB have a shorter length than the sensor PCB in an axial direction of an armature shaft of the motor.

16. The sensor PCB mounting structure of claim 1, wherein the PCB holder is formed integrally with the casing of the motor.

* * * * *